(12) United States Patent
Malloy et al.

(10) Patent No.: US 8,756,312 B2
(45) Date of Patent: Jun. 17, 2014

(54) MULTI-TIER MESSAGE CORRELATION

(75) Inventors: Patrick J. Malloy, Washington, DC (US); Marius Popa, Rockville, MD (US); Antoine Dunn, Kensington, MD (US); Daniel Fuentes, Rockville, MD (US); Christopher Hull, Bethesda, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 477 days.

(21) Appl. No.: 13/117,105

(22) Filed: May 26, 2011

(65) Prior Publication Data

US 2011/0296012 A1 Dec. 1, 2011

Related U.S. Application Data

(60) Provisional application No. 61/348,875, filed on May 27, 2010.

(51) Int. Cl.
*G06F 15/173* (2006.01)
*G06F 17/30* (2006.01)

(52) U.S. Cl.
USPC .......................................... 709/224; 707/706

(58) Field of Classification Search
USPC .......................................... 709/224; 707/706
See application file for complete search history.

(56) References Cited

U.S. PATENT DOCUMENTS

| | | | |
|---|---|---|---|
| 7,570,669 B2 | 8/2009 | Malloy et al. | |
| 7,729,256 B2 | 6/2010 | Malloy et al. | |
| 8,250,051 B2 * | 8/2012 | Bugir et al. | 707/706 |
| 2008/0281961 A1 | 11/2008 | Niemczyk et al. | |
| 2010/0199189 A1 * | 8/2010 | Ben-Aroya et al. | 715/736 |

* cited by examiner

*Primary Examiner* — Asghar Bilgrami
(74) *Attorney, Agent, or Firm* — Park, Vaughan, Fleming & Dowler LLP

(57) ABSTRACT

A system and method determines correlations within multi-tier communications based on repeated iterations/episodes of executions of a target application. Content-based correlations are determined by encoding the content using a finite alphabet, then searching for similar sequences among the multiple traces. By encoding the content to a finite alphabet, common pattern matching techniques may be used, including, for example, DNA alignment algorithms. To facilitate alignment of the traces, structural and/or semantic breakpoints are defined, and the encoding in each trace is synchronized to these breakpoints. To facilitate efficient processing, a hierarchy of causality among tier-pairs is identified, and messages at lower levels are ranked and temporally filtered, based on activity intervals at higher levels of the hierarchy.

57 Claims, 5 Drawing Sheets

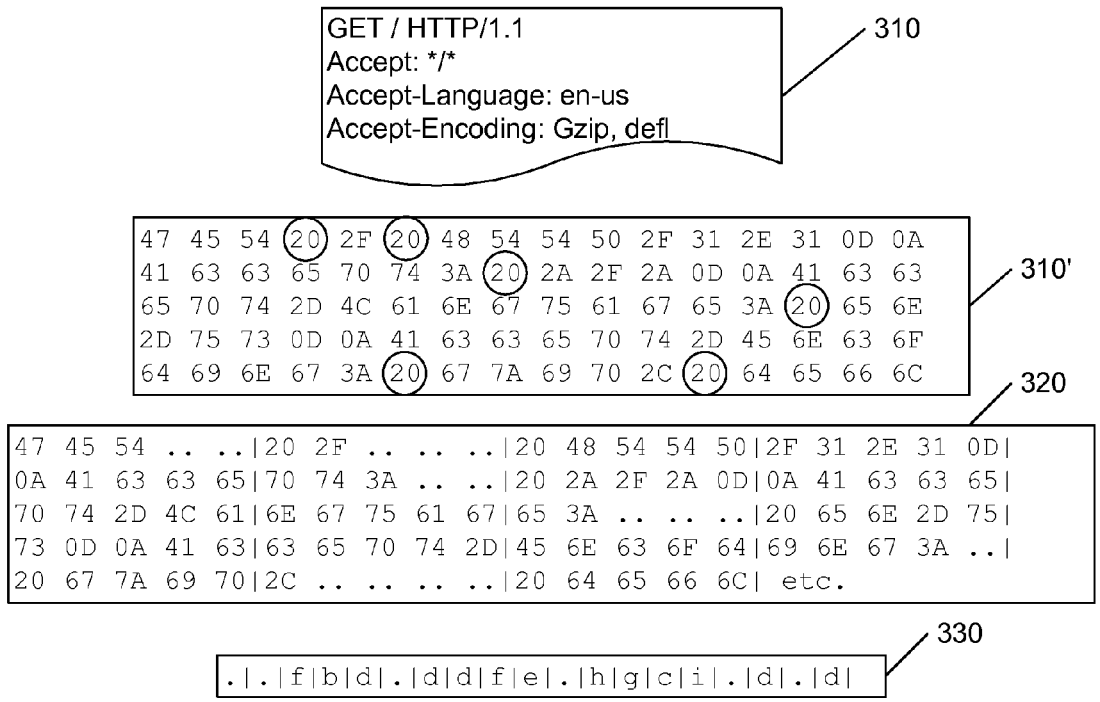
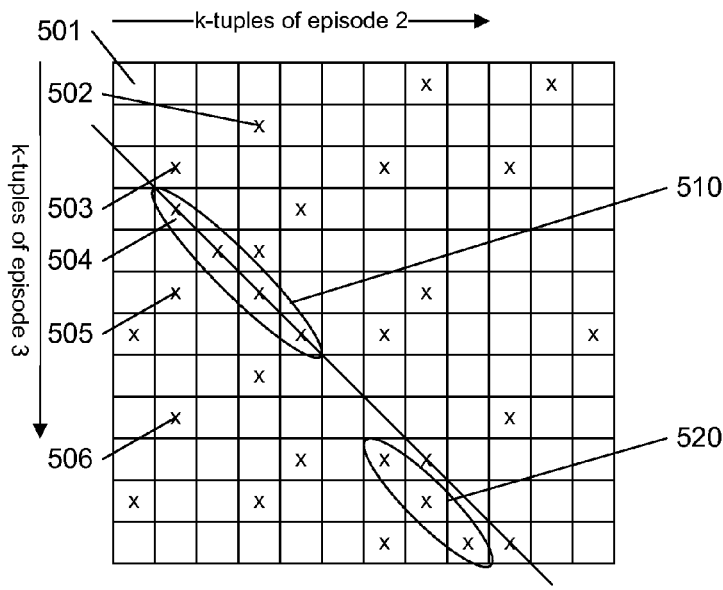
FIG. 5

MULTI-TIER MESSAGE CORRELATION

This application claims the benefit of U.S. Provisional Patent Application 61/348,875, filed 27 May 2010.

BACKGROUND AND SUMMARY OF THE INVENTION

This invention relates to the field of application performance analysis, and in particular to a method and system for identifying message streams corresponding to a transaction that includes communications between multiple tiers.

The ever-increasing use of applications that operate on a network has increased the need for application performance analysis systems that can assess the efficiency of transactions that utilize the network.

In a typical network-based application, a user executes the application at a client device, and in the process of executing the application, messages are communicated between the client and one or more servers. These messages are generally interspersed among messages from other applications being executed at the same time by the user, or by other users. To determine the performance of transactions of a particular application, the messages corresponding to the communications related to each transaction are distinguished from the other messages, so that performance data, such as delay times, can be collected.

A number of techniques are commonly used to distinguish messages related to transactions of an application, including, for example, distinguishing the source and destination addresses associated with the client and server(s) of each transaction. Such techniques, however, are unable to identify 'secondary' or 'consequential' communications associated with such transactions. That is, for example, a message from the client to a server may cause the server to contact another server, such as a database server. The resultant communications between the servers will not generally include a reference to the client, and techniques that rely upon distinguishing messages to or from the client will not be able to associate these communications with the transaction.

For ease of understanding and reference, the terms 'tier' and 'tier-pair' are used to identify the relationship among communicating elements. In the above example, the client is at a first tier (e.g. a user tier); the servers that the client communicates directly with are at a second tier (e.g. a web server tier); the servers that the servers at the second tier communicate directly with are at a third tier (e.g. a database server tier); and so on. A pair of elements that communicate directly is termed a 'tier-pair'. Note that the terms 'client', 'server', 'database', etc. are used herein to facilitate understanding; the particular elements at any given tier may comprise any type of device with communication capability.

U.S. Pat. No. 7,729,256, "CORRELATING PACKETS", issued 1 Jun. 2010 to Patrick J. Malloy, Michael Cohen, and Alain J. Cohen, discloses a method for determining (or approximating) which messages correspond to a particular transaction from among other messages in a set of multi-tier communication traces. The particular transaction is characterized as comprising a sequence of 'reference' packets, which is a sequence of packets among tier-pairs that typically occur during execution of the application, such as illustrated in FIG. 1A. For example, the reference sequence indicated by arrow 1 may correspond to a typical client's (Client A) request to a server (Web-Server B) for data, the server's request (arrow 3) to a database server (DB Server D), the database server's communication of the data (arrows 4) to the requesting server, and the requesting server's communication of this data (arrow 6) to the requesting client. The other arrows in the reference sequence FIG. 1A include, for example, communication of other requests, data, acknowledgements, and so on. These reference sequences may be based on a simulation of the application, or the operation of the application in a controlled, or isolated environment.

FIG. 1B illustrates the sequence of communications 1, 2, 3 . . . 9 corresponding to a transaction that occurs during the execution of the application on an actual network. As illustrated, the sequence is masked by other communications occurring between the tier-pairs A-B and B-D. As disclosed in U.S. Pat. No. 7,729,256, sets of traces of communications between tiers in the actual network are analyzed to find a sequence in the traces that appears to be similar to the reference sequence, based on a measure of correlation between possible sequences in the traces and the reference sequence. The correlation may be based on factors such as information in the header of the packets, the size of the packets, key words or phrases in the packets, and so on.

The use of a reference sequence to find a matching sequence of packets in a production environment, however, requires the creation and/or identification of a sequence that is representative of a transaction or set of transactions that are likely to occur during the execution of the application of interest, as illustrated in FIG. 1A. In some applications, particularly 'static' applications, this may be a fairly straightforward task. In 'dynamic' applications, such as highly interactive applications, the transactions may differ based on the particular user, or the particular tasks performed within the application. In such a dynamic environment, different reference sequences may need to be defined, each reference sequence being specific to a particular user, or a particular task.

Also, because the specific content of a sequence of packets can be expected to differ among different users of an application, the use of correlation factors based on content is fairly limited when using pre-defined reference sequences.

It would be advantageous to be able to identify sequences associated with transactions of an application in a production environment without having to identify a reference sequence a priori. It would also be advantageous to be able to automatically identify characteristic sequences within multiple traces of executions of an application at different times.

These advantages, and others, can be realized by a system and method that determines correlations within multi-tier communications based on repeated iterations of a user transaction. Content-based correlations are determined by encoding the content using a finite alphabet, then searching for similar sequences among the multiple traces. By encoding the content to a finite alphabet, common pattern matching techniques may be used, including, for example, DNA alignment algorithms. To facilitate alignment of the traces, structural and/or semantic breakpoints are defined, and the encoding in each trace is synchronized to these breakpoints. To facilitate efficient processing, a hierarchy of causality among tier-pairs is identified, and messages at lower levels are ranked and temporally filtered, based on activity intervals at higher levels of the hierarchy.

BRIEF DESCRIPTION OF THE DRAWINGS

The invention is explained in further detail, and by way of example, with reference to the accompanying drawings wherein:

FIG. 3 illustrates an example mapping of a segment of a message into a limited alphabet set.

FIG. 5 illustrates an example determination of a longest common sequence (LCS) of k-tuples within a pair of sequences.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1A:
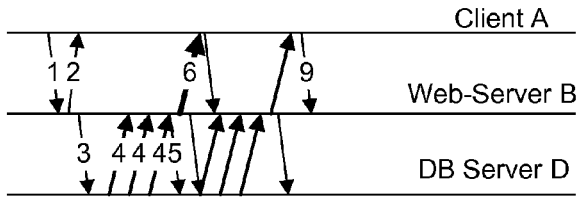
FIGS. 1A-1B illustrates an example of finding a reference sequence within a set of multiple-tier traces.
Figure 1B:
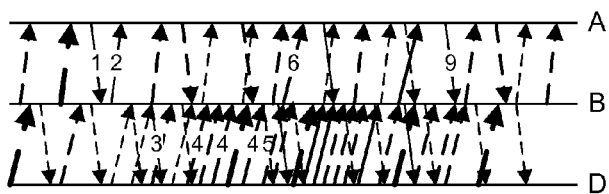
Figure 2:
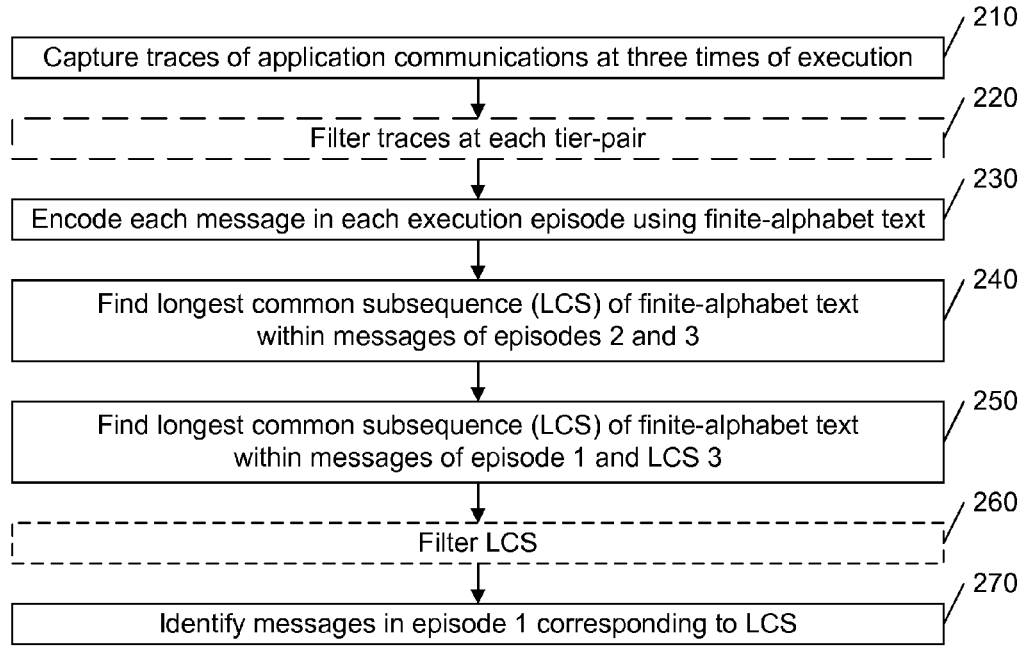
FIG. 2 illustrates an example flow diagram for finding repeated message content in a set of message traces in accordance with this invention.

FIG. 2 illustrates an example flow diagram for finding repeated message content in a set of message traces in accordance with this invention. The invention is premised on the assumption that if the same transaction is executed at different times, a number of messages occurring during each execution of the transaction will contain similar content, particularly if the transaction is executed by the same person, or a person in a similar position or context. At 210, traces from the tier pairs that are likely to be used by the transaction are captured during each episode of execution of the transaction. In this example, the traces from three separate execution episodes are captured, although one of skill in the art will recognize that any number of episodes greater than one may be captured. Capturing the traces from at least three episodes provides a higher degree of confidence that the identified messages within the traces are actually associated with transactions associated with the application.

The traces are segregated by tier-pair and direction, so that messages traveling from a given source tier to a given destination tier in each episode can be compared with each other to identify messages having similar content in the three episodes. In a preferred embodiment, the traces of the different tier-pairs are synchronized to a common timing base, so that a time ordering of occurrences at each tier pair can be established. U.S. Pat. No. 7,570,669, "AUGMENTATION TO A METHOD FOR MERGING/SYNCHRONIZING PACKET TRACES, INCLUDING MANUAL SYNCHRONIZATION", issued 4 Aug. 2009 to Patrick J. Malloy and Antoine D. Dunn, discloses determining a common time base among nodes in a network by iteratively propagating timing constraints among the nodes, and determining a time-shift to apply to the time base of each node that conforms to these constraints, and is incorporated by reference herein.

Figure 7:
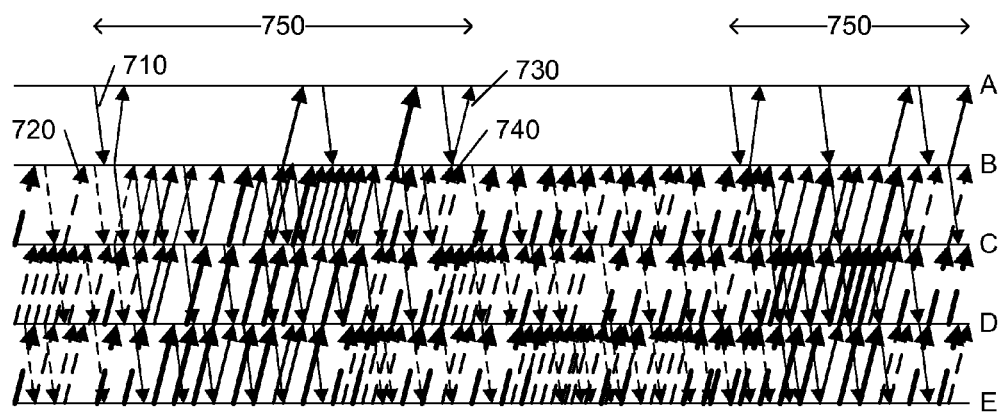
FIG. 7 illustrates an example set of communications among a variety of tier-pairs.

At 220, the traces may be filtered. With a common timing base, the extent of searching for common message content may be controlled, thereby improving the efficiency of the comparison process. As illustrated in FIG. 7, for example, communications at the 'first' tier pair A-B between a particular client/user at tier A and a server at tier B can generally be easily identified. In general, messages that occur on the next 'lower' tier pair B-C before an initial communication 710 from the client to the server can be ignored, because they could not be in response to the client's request to the server. Such "ignorable" messages 720 are identified in FIG. 7 using dashed lines. In like manner, if a message 730 at the uppermost tier-pair A-B can be identified as a termination of a particular transaction, or activity interval 750, between the client and server, messages 740 on the tier pair B-C after this termination message 730 may also be ignored. Other techniques for identifying intervals of time that can be ignored may also be used.

In a preferred embodiment of this invention, messages or transactions at each tier-pair are filtered and rank-scored based on parameters associated with messages at other tier-pairs. In particular, a 'hierarchy' of tier-pairs is defined relative to an execution of a particular application, and the messages at tier-pairs at lower levels of the hierarchy are filtered and ranked based on the parameters associated with messages or activity intervals at tier-pairs at higher levels of the hierarchy.

Figure 8:
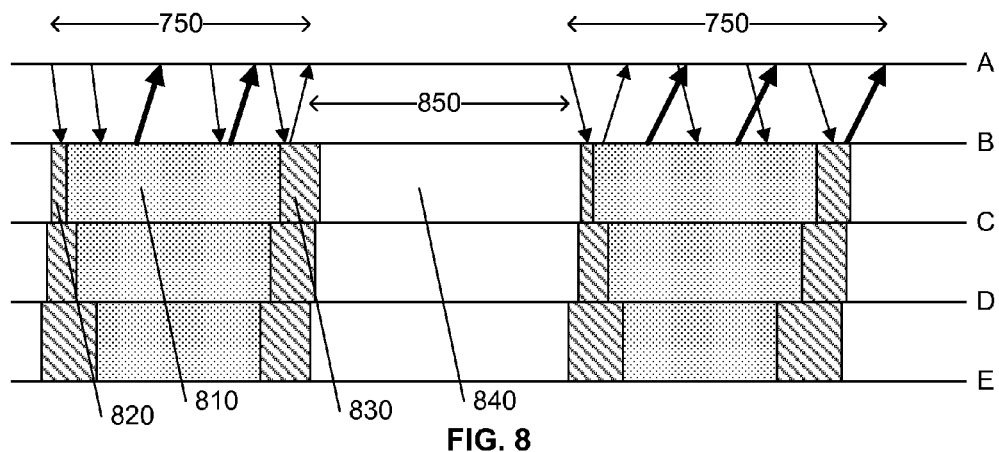
FIG. 8 illustrates an example of filtering and ranking messages and activity intervals based on a causal hierarchy among tier-pairs.

FIG. 8 illustrates an example of filtering and ranking messages and activity intervals at lower levels of a hierarchy of tiers based on activity intervals at higher levels of the hierarchy. In this example, a simple hierarchy A-B-C-D-E is illustrated, but one of skill in the art will recognize that other tier-pair arrangements may exist, such as tier-pair B-D for communications directly between tier B and D, without having to pass through intermediate node C. For the purposes of this invention, the term hierarchy is used in a general sense, commonly illustrated as a directed acyclic graph that indicates an assumed or potential causal relationship, or chain of communication, among tier-pairs. That is, in FIG. 8, for example, it is assumed that messages from tier A to tier B may cause messages to be sent from tier B to tier C (or other tier), and thus tier-pair B-C is at a lower level of the hierarchy with regard to messages from tier A to tier B.

Within each tier-pair, messages are assessed to identify discrete activity intervals. For example, an activity interval may be identified by determining a maximal set of consecutive request-response pairs that occur in close time-proximity to each other. That is, if there is a long gap of time between one request-response pair and another, the second request-response pair is likely to be the start of a new activity interval. Note that this partitioning of messages into activity intervals is primarily a means of reducing the amount of data that needs to be processed, by grouping multiple messages into such activity intervals, and need not be precise. If a short 'inactivity interval' 850 is used, more groups will be formed; if a long inactivity interval 850 is used, unrelated activities may be grouped into a single activity. In a preferred embodiment, the system may present the results of this partitioning, and allow the user to adjust the duration of the inactivity interval 850. Similarly, the system may use heuristic and other techniques to automate the determination of a suitable inactivity interval 850.

After identifying the activity intervals at each tier-pair, each activity interval is scored based on its relationship to the activity intervals of its upper tier-pairs. Illustrated in FIG. 8 are four types of regions 810, 820, 830, 840 that may categorize such activity intervals at lower-level tier-pairs. If a lower-level activity interval occurs in a region 810 that is well within the activity interval 750 of its parent there is no apparent reason to assume that the activity intervals in this region 810 are not related to messages in the activity interval 750. However, activity intervals in regions 820, 830 near the beginning or end of the activity interval 750 may be less likely to have been associated with the messages of activity interval 750, due to the imprecise nature of the definition of activity intervals, particularly at lower levels of the hierarchy. Activity intervals that are within region 840 and well outside the activity interval 750 are very unlikely to be associated with the upper level activity interval 750.

In an embodiment of this invention, the activity intervals of lower-level tier-pairs are scored based on a variety of criteria, including, for example, determining an amount of overlap between the activity intervals. A lower level activity interval that is totally contained within the upper-level activity interval will score highly; one that is only partially contained within the upper-level activity interval will score lower. Additional scoring techniques may also include granting 'bonus' points to activity intervals at the lower-level that begin very near to the beginning of the upper-level activity interval, as well as to lower-level activity intervals that end very near to the end of the upper-level activity interval. In like manner, 'penalty' points may be assessed against lower-level activity intervals that start before the start of its upper-level activity interval, or against lower-level activity intervals that end after the end of its upper level activity interval.

Other scoring and ranking schemes may also be used. For example, the duration of a given activity interval may be attributable to activities at levels at or below the particular tier-pair. That is, time is either being consumed by processing at the particular tier, or processing and communication at tiers below the particular tier. Accordingly, a lower level activity interval, or set of activity intervals, that "fills" the upper level activity interval, thereby accounting for the time of the upper level activity interval, may be scored higher than an activity interval or set of intervals that do not account for the entire duration of the upper level activity interval.

After scoring all of the activity intervals, the resultant scores are used to determine whether the content of the messages contained within each activity interval is to be subsequently processed. In a straightforward embodiment of this feature, only messages in activity intervals that score higher than a given minimum score are considered for subsequent analysis. In another embodiment, the scores are used to rank the activity intervals, and only messages in the "Top-N" activity intervals at each level are considered for subsequent analysis.

Having identified messages that may be related to the transaction being assessed, the content of these messages in multiple episodes of the transaction are assessed to identify substantially similar messages in all of these episodes, as detailed further below with regard to the flow diagram of FIG. 2.

As noted above, except in fairly static situations, the content of messages associated with repeated executions of an application will rarely be 'identical', and therefore a search for identical messages within each episode is not likely to be successful for typical executions of an application of moderate complexity. Therefore, in accordance with a feature of this invention, some or all of the content of each message is encoded using a finite-alphabet, at 230, and the search for similar messages is based on a comparison of these finite-alphabet encodings of each message in each episode, at 240.

The use of a finite-alphabet encoding in lieu of the actual message content provides potential advantages with regard to the time and complexity required to compare the content of messages, as well as with regard to finding 'similar' but not 'identical' messages. In a preferred embodiment of this invention, multiple bytes of a message are encoded into a single 'letter' of the finite-alphabet. In a text message, for example, words will be encoded using substantially fewer letters, and the occurrence of the same word in messages in multiple episodes of an application can be identified as the occurrence of these fewer letters in the encoded versions of the messages. In like manner, difference in the content of the messages may be identified by differences in the fewer letters. In non-text messages, a similar efficiency is achieved by encoding multi-byte sequences into a single letter for comparison with similarly encoded multi-byte sequences.

At 240, the encoded messages in two of the episodes are compared to find matching sequences of encoded letters of the finite-alphabet text to identify one or more longest common sequences (LCS) within the encoded messages. In this example, the encoded messages of the second and third episodes are compared, but one of skill in the art will recognize that any pair of episodes may be compared. Any of a number of techniques may be used to perform the comparison and determine the LCS(s), as detailed further below, including those commonly used to compare DNA sequences.

At 250, the process of 230-240 is repeated, using the encoded messages of the remaining episode (in this example, the first episode) and the determined LCS (in this example, the LCS of the second and third episodes), to determine a longest common sequence (LCS) corresponding to the combination of the encodings of the communications that occurred in each of the three episodes.

At 260, and at other stages of the example process, the determined LCS may optionally be analyzed/filtered to accommodate false negatives in the alignment process and/or reduce the effects of false positives in this process. For example, if the size of the limited-alphabet set is small, the likelihood of different original sequences being encoded into the same set of encoded letters is relatively higher than in a larger sized limited-alphabet set.

Having determined a sequence that appears to be repeated in the encoded messages of the three episodes of an application, the corresponding messages in at least one of the episodes (e.g. episode 1) are identified, at 270. This identification of messages of a transaction corresponding to the execution of the application may subsequently be provided to other analysis systems to perform any of a variety of tasks, including determining timing and delay characteristics associated with the transaction, determining changes in either the application or the network that may improve these characteristics, and so on. Copending U.S. patent application Ser. No. 12/060,271, "NETWORK DELAY ANALYSIS INCLUDING PARALLEL DELAY EFFECTS", filed 1 Apr. 2008 for NIEMCZYK et al., incorporated by reference herein, for example, discloses a variety of techniques for identifying dependencies among messages in a multi-tier environment, and subsequently identifying possible improvements to the network taking these dependencies into account.

These identified messages may also be provided as a 'reference sequence' in an embodiment of the aforementioned "CORRELATING PACKETS" patent (U.S. Pat. No. 7,729, 256) for analyses of subsequent executions of the application. As noted above, different users of an application may often have different characteristic sequences, and this invention could enable the creation of different reference sequences for each particular user or class of users. In like manner, the above described technique of identifying similar messages based on a limited-alphabet encoding of message content may be used in an embodiment of the "CORRELATING PACKETS" patent for providing a measure of correlation between individual packets based on message content.

FIG. 3 illustrates an example encoding of a message 310 into a limited-alphabet message 330. In FIG. 3, the message 310 is illustrated in two forms, a text form 310 and an equivalent hexadecimal form 310', each two-digit hexadecimal number in message 310' corresponding to an ASCII encoding of the characters in the message 310. For example, the first word ("GET") in message 310 corresponds to the first three ASCII bytes (47, 45, 54) in message 310'.

In accordance with a feature of this invention, 'breakpoints' may be defined to facilitate aligning of the content among the messages of the multiple episodes. Because the content of the message 310 is being encoded into a limited-alphabet text, an offset of as little as one byte in the original message of the two episodes being compared will likely produce a completely different encoding of these two messages. By using definable breakpoints, the impact of such offsets can be limited to the interval between breakpoints. The breakpoints may include both 'structural' breakpoints and 'semantic' breakpoints. A structural breakpoint may be, for example, the end of each packet, or an imposed breakpoint after a given number of bytes. A semantic breakpoint, on the other hand, may be a commonly occurring character or symbol within the expected content, such as a "space" character in a text document, or an "end of record" character in a database file.

In the example of FIG. 3, the occurrence of a "space" (ASCII "20") in the text of the message 310 is defined as a breakpoint; in this manner, the encoding of the message will generally correspond to an encoding of each individual word. One of skill in the art will recognize that alternative or additional breakpoints may also be defined. For example, in a text file, the end of a line and start of a new line is usually encoded as a "Carriage Return" ("CR—ASCII "0D")—"Line Feed" ("LF"—ASCII "0A") or vice versa. One could define any or all of these characters, or sequence of characters, as breakpoints to assure that the start of each new line re-synchronizes the comparison process. In like manner, in a non-text file, such as a non-text database file, the symbols used to indicate the start and/or end of each data record may be used as breakpoints.

As noted above, a preferred encoding of the original message encodes a plurality of bytes in the original message into a single letter of the limited-alphabet set. For ease of reference, the term 'block' is used to identify the plurality of bytes that are encoded into a single letter. The block-size may be determined based on any number of factors. A large block-size will result in a high degree of 'compression' of the original message into a much smaller encoded message, thereby reducing the number of letters that must be compared between encoded messages of the different episodes. However, the likelihood of two relatively long sequences of bytes in the two messages being identical to each other (thereby producing the same encoded letter) is reduced, compared to a smaller block-size. In general, the nature of the messages associated with a given transaction of an application will determine the appropriate balance between reducing the size of the messages to be compared and improving the likelihood of successful matches. If the nature of the messages associated with a given transaction is text-based, a block size of four to eight may be preferred, because the average size of a word is generally between four and eight characters. If the messages are non-text database records, on the other hand, the average size of the record-header, or record-descriptor, may be used to determine an appropriate block size.

At 320, the partitioning of the message 310 based on a five-character block size and the use of a space character ("20") as a breakpoint in the message 310' is illustrated. Upon each occurrence of a space character, a new five-byte block is started. As illustrated at 320, the word "GET" (47 45 54) forms a first block, then a new block is started when the space (20) after "GET" occurs. A subsequent new block is started when the space (20) occurs after the "/" (2F) character. The next set of characters "HTTP/1.1", followed by an end of line (CR-LF; 0D 0A) and the word "Accept" does not contain a space (20), and thus forms three complete blocks and a partially filed block corresponding to the last three letters ("ept") before the space.

As illustrated in the example of 320, each byte in the original message 310' is included within the blocks, with the breakpoint character (20) appearing at the start of a new block. However, alternative schemes may be used to partition the content of the original message. For example, the character(s) used as breakpoints could be placed in the prior block, rather than at the start of the new block, or could be eliminated completely. In like manner, commonly occurring "noise" words, such as articles and pronouns may be omitted to avoid different messages appearing to be similar. In like manner, if it is known that the message 310 is a text file, all of the characters may be converted to either upper-case or lower-case, and punctuation marks may be omitted. These and other techniques for improving the efficiency of the encoding and comparison process will be evident to one of skill in the art in view of this disclosure.

The partitioned blocks are subsequently encoded into letters of a limited-alphabet set, using any number of encoding techniques. Typically, a hash function having an output range that corresponds to the size of the alphabet may be used; as each hash value is produced, a corresponding letter, or equivalently, the hash value itself, is stored as the encoded message 330. The particular hash function used is immaterial, but one that is sensitive to the actual sequence of bytes in the block is generally preferred, so that, for example, "abcde" does not necessarily produce the same letter as "badec". In like manner, a hash function that provides a somewhat uniform distribution of encoded letters when the original message is somewhat typical of an expected distribution of sequences of bytes is also preferred. One of skill in the art will recognize that hash functions having particular output characteristics relative to the characteristics of their input variables are common in the art.

Incomplete blocks may be encoded or omitted, typically depending upon the expected form or content of the original messages and/or depending upon the degree of incompletion. For example, the rule may be that all blocks are encoded, an incomplete block that is more than half full may be encoded, no incomplete blocks are encoded, etc. Depending upon the encoding process (hashing function) used, incomplete blocks may need to be "filled", using, for example, spaces to complete the block. The particular rules for dealing with incomplete blocks are somewhat immaterial, provided, of course, that the same rules are applied for each episode's messages, and provided that the subsequent matching process does not impose constraints with regards to 'gaps' in sequences.

In the example of FIG. 3, incomplete blocks are not encoded, as illustrated by the "." in the corresponding block encoding area. In this example, a ten-letter (a-j) alphabet set is used, and the third block (20 48 54 54 50) is hashed to a value of 06, corresponding to the letter "f" at the third block area of 330. In like manner, the fourth block (2F 31 2E 31 0D) is hashed to a value of 02, corresponding to the letter "b". In this example, the encoding of the message 310, corresponding to a message in one episode, produces the sequence "fbdddfehgcidd". The subsequent sequence matching process will use this sequence to determine whether an encoded message in another episode includes a similar sequence, as detailed further below. In this example, a comparison of an eighty character message 310 is reduced in complexity to a comparison of a thirteen character encoded sequence 330.

One of skill in the art will recognize that the block partitioning and encoding into a single letter may be provided as a single function, such that the separate representation illustrated in 320 may never actually be produced. Similarly, one of skill in the art may also recognize that a fixed block size need not be used. For example, the beginning of each line, or each data record may be partitioned into a block that captures a descriptor (such as a "GET" command, or a data-type) regardless of size, with the remainder of the line being partitioned into blocks based on other criteria, such as the aforementioned fixed sized blocks. The particular technique used to partition the original message is somewhat immaterial, provided that the same technique is used for messages in each of the episodes being compared, and provided that the encoding process is compatible with the blocks produced. In like manner, different blocking and/or encoding techniques may be used for messages at different tier-pairs, or messages between particular source and destination nodes.

Figure 4:
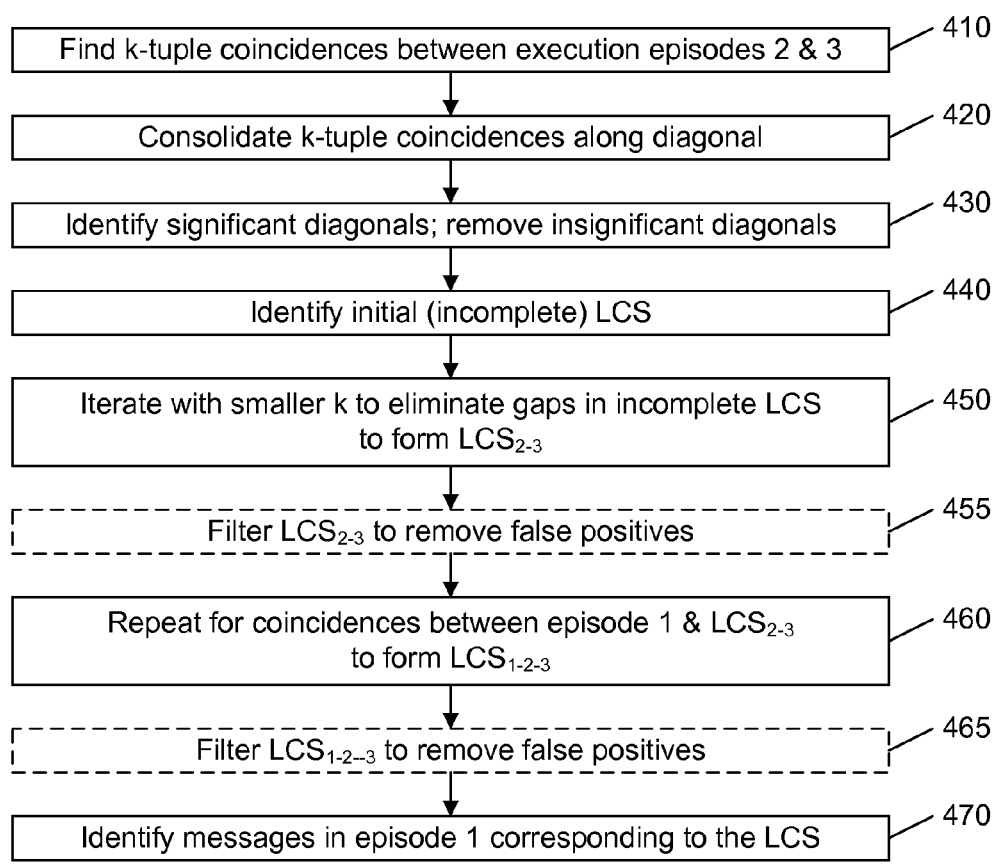
FIG. 4 illustrates an example flow diagram for aligning a pair of sequences.

FIG. 4 illustrates an example flow diagram for aligning and comparing sequences in the encoded messages of two episodes of execution of an application, with reference to the table of FIG. 5.

Even though the above detailed encoding of the original messages significantly reduces the amount of data that needs to be compared, further efficiencies may be required or desired. In accordance with a feature of this invention, instead of comparing each letter in each encoded message of an episode with each letter in each encoded message of another episode, sequences of encoded letters ("k-tuples") are compared. That is, for example, in the above example sequence of "fbdddfehgcidd", instead of finding a first "f" in the other episode's encoded sequence, followed by finding a subsequent "b", followed by a subsequent "d", in a preferred embodiment, the comparison process may initially attempt to find a 3-tuple "fbd" (first three letters) in the other episode's encoded sequence, followed by a subsequent 3-tuple "ddf" (second set of three letters). Alternatively, the second 3-tuple could be "bdd" (second through fourth letters), which would not be as efficient as searching for the next exclusive set of three letters, but would likely improve the likelihood of finding successful matches. Although this second alternative performs a comparison for each next letter, the criteria for matching is the occurrence of the same three-letter sequence in the other episode's message, significantly reducing "false matches", as compared to the matching of single characters.

As with the choice of block size, the choice of the size of the k-tuple is generally a tradeoff between efficiency and likelihood of successful matches, the likelihood of successful matches being dependent upon the nature of the messages being compared, as well as the size of the alphabet. In a general case, "k" is rarely greater than 8. The search-space (i.e. the span of messages being compared) may also affect the choice of "k"; if the search-space is small, the value of k may be lowered without significantly affecting performance. In a preferred embodiment of this invention, if a search with a given value of k fails to identify any "significant" correlations between the encoded messages of the episodes being compared, the value of k is reduced and the process is repeated.

At 410 of FIG. 4, the k-tuple sequences of two episodes (2 and 3) are compared, and the coincidences are identified, as illustrated by "X"s in FIG. 5. As illustrated in FIG. 5, the first k-tuple of the encoded message of episode 2 does not match the first k-tuple of episode 3, and the corresponding space 501 is not marked. The fourth k-tuple of episode 2 (the fourth column of FIG. 5) is found to match the second k-tuple of episode 3 (the second column of FIG. 5), and the corresponding space 502 is marked. In like manner, the second k-tuple of episode 2 is found to match the third, fourth, sixth, and ninth k-tuples of episode 3, and the corresponding spaces 503-506 are marked.

The diagonals of FIG. 5 correspond to a sequential series of k-tuples between the episodes. A series of markings along a diagonal indicates a continual series of coincidences of k-tuple valued between the episodes. That is, the series of markings that form an "island" 510 along the diagonal indicate that the second through fifth k-tuples of episode 2 matched the fourth through seventh k-tuples of episode 3, and the island 520 indicates that the seventh through ninth k-tuples of episode 2 matched the tenth through twelfth k-tuples of episode 3. Such series of coincidences between the encoded messages of episodes 2 and 3 indicate a high likelihood that the original messages were similar. At 420, the k-tuples along each diagonal are identified and consolidated into such islands.

At 430, 'significant' diagonals are identified, and insignificant diagonals are removed, to improve the efficiency of subsequent processes. Any number of techniques may be used to distinguish between significant and insignificant diagonals. In an example embodiment of this invention, the number of coincident k-tuples along each diagonal are counted, and the average and deviation among these counts is noted. Diagonals having a number of coincident k-tuples that is greater than one standard deviation above the average are considered to be significant. Additionally, diagonals to the left and right of significant diagonals, within a given window width, are also considered to be significant. The window width may be user selectable, and may be dependent upon the size of the number of k-tuples being compared; in an example embodiment, a default window width of 25 is used.

One of skill in the art will recognize that alternative techniques may be used to distinguish runs of coincidences in k-tuples of encoded messages of a pair of episodes of an application. For example, instead of assessing each diagonal independently, one may assess groups of diagonals to identify groups that exhibit a higher-than-average number of coincidences. In this manner, 'slips' or 'gaps' between sequences of coincidences in the episodes may be better accommodated. Similarly, diagonals in the upper-right and lower-left of the coincidence matrix may be omitted when their length is determined to be too short to allow for a meaningful number of coincidences. That is, comparing a long sequence of k-tuples that occur at the beginning of one episode with a much smaller number of k-tuples that occur at the end of the other episode can generally be avoided. Other techniques for reducing the number of k-tuples that need to be assessed in the subsequent processes will be evident to one of skill in the art in view of this disclosure.

After eliminating the insignificant diagonals, the remaining coincidences are assessed to determine sequences of coincidences that indicate that similar original messages are present in each episode. If there are no significant diagonals, the encoded messages are determined to be dissimilar, and a next pair of encoded messages is assessed.

Any number of a variety of techniques may be used to identify similar encoded messages. In a relatively simple embodiment of this invention, heuristics may be used to determine that a message in one episode appears to be similar to a message in the other episode. For example, a count of k-tuple coincidences within coincidence islands of a given minimum size may be accumulated, and if this count is above a given threshold value, the messages may be determined to be sufficiently similar to each other.

In a preferred, more robust embodiment, a longest common sequence (LCS) of coincident k-tuples within the encoded messages of the two episodes is determined, at 440. Any number of existing processes may be used to determine the LCS, although a sparse dynamic programming algorithm would generally be the most efficient. Examples of such algorithms include Hirschberg, Needleman-Wunsch, and Smith-Waterman.

Initially, with a relatively large value of "k", the pattern of coincident k-tuples is likely to include "gaps" between the coincidence islands, and the determination of an LCS will be incomplete. To further complete the LCS solution, the value of "k" is reduced, and the process 410-440 is repeated for each of the gaps. When no gaps remain, or the value of k cannot be reduced beyond 1, this iterative process 450 is terminated, and the determined LCS solution is recorded.

Because the encoding to a limited alphabet may produce the same letter for different input sequences in the original message, many reported matches in the encoded sequence may not correspond to actual matches in the original messages. Optionally, at 455, the determined LCS solution may be filtered to remove such false positives, particularly if certain letters are found to occur more frequently than others. For example, the Baum-Welch or similar algorithm may be used to generate a hidden Markov model (HMM), and then the Viterbi or similar algorithm may be applied to the LCS solution using this HMM to eliminate many of these false positives.

After determining the LCS within the encoded messages of episodes 2 and 3, the process 410-455 is repeated, using the encoded messages of episode 1 and the determined LCS, as indicated at 460 of FIG. 4. If other techniques are used to identify similar encoded messages in episodes 2 and 3, these techniques would be applied to determine whether these similar encoded messages also appear in episode 1. For example, if an accumulated count of coincidences within islands of a given minimum size is used to identify similar encoded messages in episodes 2 and 3, the encoded messages in episode 1 will be compared to one or both of these encoded messages to determine whether any of the messages in episode 1 also contains a sufficiently high accumulated count.

At 470, the original messages in one or more of the episodes corresponding to the LCS, or corresponding to an otherwise matched set of encoded messages are identified. Optionally, as at 455, the determined LCS of the combination of the three episodes may optionally be filtered to reduce false positives, at 465.

The process 410-470 is repeated for each encoded message in the episodes, so that each encoded message in episode 2 is compared to each encoded message in episode 3, then each encoded message in episode 1 is compared to the LCS or the set of messages that appear to be similar in episodes 2 and 3.

As noted above, the list of messages that appear to be repeated in each of the three episodes may be provided to any number of performance analysis systems. Application and network timing characteristics may be determined by assessing the trace records corresponding to these messages. In like manner, the determined LCS, or the determined set of encoded messages that appear to be similar in all three episodes, may be used to identify messages in subsequent execution episodes of the application.

Figure 6:
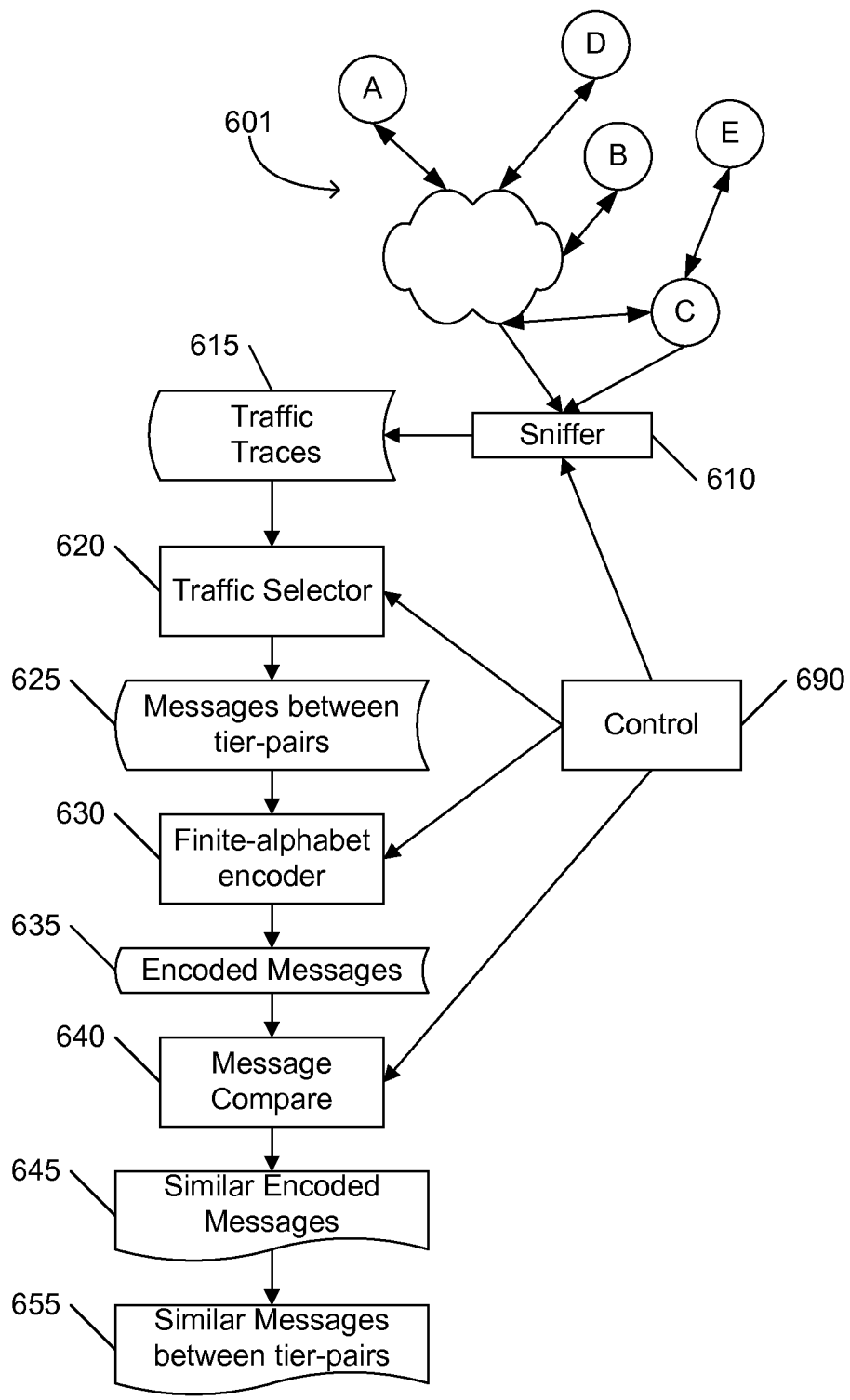
FIG. 6 illustrates an example block diagram of a system for identifying repeated message content in a set of message traces in accordance with this invention.

FIG. 6 illustrates an example block diagram of a transaction analysis system that is suitable for correlating messages in a multi-tier network environment 601 in accordance with this invention. A single control element 690 is illustrated as providing control over the other elements in the system, although distributed control, including manual control, may also be used.

One or more traffic capture devices 610, typically termed "sniffers", are configured to capture the traffic between select tier-pairs, and to store some or all of the captured traffic as "traces" 615. These traces 615 may be the result of a continuous monitoring of the traffic on the select tier-pairs, or a collection of discrete traces taken during different time intervals.

A traffic selector 620 is configured to select particular messages 625 between tier-pairs from among the traces 615. In accordance with an aspect of this invention, the selected messages should correspond to messages that occur between tier-pairs during different executions of a 'target' application transaction, the tier-pairs corresponding to tier-pairs that are likely to communicate messages as a result of the execution of the target application transaction.

The traffic selector 620 may also be configured to filter the messages between a source and destination of a tier-pair based on events that occur during the execution of the application. For example, as detailed above, messages that could not be related to the application because they occur before a first message of the transaction or after a last message of the transaction are not selected for subsequent processing. In like manner, because the subsequent processes are based on the content of the monitored messages, the traffic selector 620 may be configured to eliminate commonly occurring messages, such as acknowledgement messages, or messages that are likely to be too short to provide a meaningful comparison result.

A finite-alphabet encoder 630 is configured to encode the selected messages between tier-pairs using letters of a finite-alphabet set. Preferably, this encoding results in encoded messages 635 that are substantially shorter than the actual messages between the tier-pairs. Typically, the encoder 630 includes a hash function having an output range that corresponds to the size of the finite-alphabet set.

A message comparer 640 is configured to compare the encoded messages in one episode to the encoded messages in another episode to identify encoded messages 645 that appear to be similar. Because the encoded messages are substantially smaller than the actual messages between tier-pairs, the time to perform this comparison is substantially smaller. Additionally, because the encoding is not unique, and different input sequences may produce the same encoded letter, the comparer 640 is preferably configured to attempt to match sequences (k-tuples) of encoded letters, rather than individual letters. This further improves efficiency by reducing the likelihood of identifying spurious matches that are merely the result of this many-to-one encoding process.

The comparer 640 identifies coincidences of the same k-tuple appearing in the messages of each of the episodes, and processes these coincidences to determine whether an encoded message in one episode appears to be similar to an encoded message in another episode. In an example embodiment of this invention, as detailed above, similar encoded messages are identified by determining a longest common sequence (LCS) occurring in the two messages, and then the messages of another episode are compared to the determined LCS to determine whether this other episode also contains an encoded message corresponding to this determined LCS. One of skill in the art will recognize that any of a variety of techniques are commonly available for comparing sequences, including those developed for comparing DNA and other sequences.

Based on the determination that certain encoded messages appear to be common among the episodes, the actual messages between the tier-pairs corresponding to these common encoded messages are identified 655, and provided to other tools that are configured to assess communications associated with the target application.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any feasible combination thereof.

f) hardware portions may include a processor, and software portions may be stored on a non-transitory computer-readable medium, and may be configured to cause the processor to perform some or all of the functions of one or more of the disclosed elements;

g) hardware portions may be comprised of one or both of analog and digital portions;

h) any of the disclosed devices or portions thereof may be combined together or separated into further portions unless specifically stated otherwise;

i) no specific sequence of acts is intended to be required unless specifically indicated; and j) the term "plurality of" an element includes two or more of the claimed element, and does not imply any particular range of number of elements; that is, a plurality of elements can be as few as two elements, and can include an immeasurable number of elements.

We claim:

1. A method comprising:
capturing a plurality of network traces, each network trace corresponding to original messages communicated between two nodes of a tier-pair during an execution episode of an application,
encoding, by a transaction analysis system, content of some or all of the original messages in each network trace into letters of a finite-alphabet set to form corresponding encoded messages, such that a single letter of the finite-alphabet in each encoded message corresponds to a plurality of bytes in the original message,
comparing, by the transaction analysis system, the encoded messages of a first episode to the encoded messages of a second episode to identify encoded messages that are similar to each other, and
identifying, by the transaction analysis system, original messages in at least one of the plurality of network traces corresponding to the encoded messages that are identified as being similar to each other.

2. The method of claim 1, including filtering the network traces to identify the original messages of the tier-pair based on messages communicated between nodes of an other tier-pair.

3. The method of claim 2, including grouping the messages of the other tier-pair into activity intervals, and filtering the network traces based on parameters associated with these activity intervals.

4. The method of claim 2, including grouping the original messages of the tier-pair into first activity intervals, grouping the messages of the other tier-pair into second activity intervals, and filtering the network traces based on a correspondence in time between the first and second activity intervals.

5. The method of claim 4, including scoring the first activity intervals based on the correspondences in time and filtering the network traces based on the scoring.

6. The method of claim 5, wherein the scoring is based on:
an overlap in time between the first and second activity intervals,
a correspondence in time between a start of the first activity interval and a start of the second activity interval, and
a correspondence in time between an end of the first activity interval and an end of the second activity interval.

7. The method of claim 1, wherein the encoding includes a hashing of the plurality of bytes of the original message.

8. The method of claim 1, including forming one or more of the plurality of bytes of the original message based on break points associated with the original message.

9. The method of claim 8, wherein the break points are based on a structure of the original message.

10. The method of claim 8, wherein the break points are based on content of the original message.

11. The method of claim 1, wherein comparing the encoded messages of the first and second episodes includes forming k-tuples of letters of the first and second encoded messages and comparing the k-tuples of the first and second encoded messages.

12. The method of claim 11, including comparing the first and second encoded messages based on k-tuples of a first size, then comparing at least parts of the first and second encoded messages based on k-tuples of a second size that is smaller than the first size.

13. The method of claim 11, wherein comparing the first and second encoded messages includes creating a matrix of coincidences between the first and second encoded messages and assessing coincidences of k-tuples along diagonals of the matrix.

14. The method of claim 13, wherein assessing the coincidences includes accumulating a count of sequential coincidences along the diagonals.

15. The method of claim 1, wherein comparing the encoded messages of the first and second episodes includes determining a longest common sequence of coincidences of letters in the encoded messages.

16. The method of claim 1, including comparing encoded messages of a third episode of the application to the encoded messages of the first and second episodes that are identified as being similar to identify encoded messages that are similar in the first, second, and third episodes.

17. A method comprising:
identifying, at a performance analysis system, a hierarchy of tier-pairs, such that messages at a higher level of the hierarchy have a causal relationship to one or more messages at a lower level of the hierarchy, capturing traces of messages communicated within the tier-pairs, identifying, by the performance analysis system, activity intervals at each tier-pair corresponding to sequences of messages at each tier-pair, assessing, by the performance analysis system, the activity intervals at each lower level tier-pair based on parameters associated with activity intervals at a higher level tier-pair to identify activity intervals at the lower level tier pair that are potentially related to activity intervals at the higher level tier pair, and comparing, by the performance analysis system, the messages of activity intervals at the lower level tier-pairs that are potentially related to activity intervals at the higher level tier pair to identify messages at the lower level tier-pairs corresponding to one or more activity intervals at a highest level tier-pair.

18. The method of claim 17, wherein comparing the messages includes: encoding content of some or all of the messages into letters of a finite-alphabet set to form corresponding encoded messages, such that a single letter of the finite-alphabet in each encoded message corresponds to a plurality of bytes in the original message, and comparing the corresponding encoded messages.

19. The method of claim 17, wherein the messages being compared at each tier-pair correspond to messages captured during repeated executions of an application.

20. A non-transitory computer-readable medium that includes software that, when executed by a processor causes the processor to:

receive a plurality of network traces, each network trace corresponding to original messages communicated between two nodes of a tier-pair during an execution episode of an application, encode content of some or all of the original messages in each network trace into letters of a finite-alphabet set to form corresponding encoded messages, such that a single letter of the finite-alphabet in each encoded message corresponds to a plurality of bytes in the original message, compare the encoded messages of a first episode to the encoded messages of a second episode to identify encoded messages that are similar to each other, and identify original messages in at least one of the plurality of network traces corresponding to the encoded messages that are identified as being similar to each other.

21. The medium of claim 20, wherein the software causes the processor to filter the network traces to identify the original messages of the tier-pair based on messages communicated between nodes of an other tier-pair.

22. The medium of claim 21, wherein the software causes the processor to group the messages of the other tier-pair into activity intervals, and filter the network traces based on parameters associated with these activity intervals.

23. The medium of claim 21, wherein the software causes the processor to group the original messages of the tier-pair into first activity intervals, group the messages of the other tier-pair into second activity intervals, and filter the network traces based on a correspondence in time between the first and second activity intervals.

24. The medium of claim 23, wherein the software causes the processor to score the first activity intervals based on the correspondences in time and filter the network traces based on a score of each of the first activity intervals.

25. The medium of claim 24, wherein the score is based on: an overlap in time between the first and second activity intervals, a correspondence in time between a start of the first activity interval and a start of the second activity interval, and a correspondence in time between an end of the first activity interval and an end of the second activity interval.

26. The medium of claim 20, wherein the software causes the processor to encode the messages via a hashing of the plurality of bytes of the original message.

27. The medium of claim 20, wherein the software causes the processor to form one or more of the plurality of bytes of the original message based on break points associated with the original message.

28. The medium of claim 27, wherein the break points are based on a structure of the original message.

29. The medium of claim 27, wherein the break points are based on content of the original message.

30. The medium of claim 20, wherein the software causes the processor to compare the encoded messages of the first and second episodes by forming k-tuples of letters of the first and second encoded messages and comparing the k-tuples of the first and second encoded messages.

31. The medium of claim 30, wherein the software causes the processor to compare the first and second encoded messages based on k-tuples of a first size, then compare at least parts of the first and second encoded messages based on k-tuples of a second size that is smaller than the first size.

32. The medium of claim 30, wherein the software causes the processor to compare the first and second encoded messages by creating a matrix of coincidences between the first and second encoded messages and assessing coincidences of k-tuples along diagonals of the matrix.

33. The medium of claim 32, wherein the software causes the processor to assess the coincidences includes accumulating a count of sequential coincidences along the diagonals.

34. The medium of claim 20, wherein the software causes the processor to compare the encoded messages of the first and second episodes by determining a longest common sequence of coincidences of letters in the encoded messages.

35. The medium of claim 20, wherein the software causes the processor to compare encoded messages of a third episode of the application to the encoded messages of the first and second episodes that are identified as being similar to identify encoded messages that are similar in the first, second, and third episodes.

36. A non-transitory computer-readable medium that includes software that, when executed by a processor causes the processor to:

identify a hierarchy of tier-pairs, such that messages at a higher level of the hierarchy have a causal relationship to one or more messages at a lower level of the hierarchy, receive traces of messages communicated within the tier-pairs, identify activity intervals at each tier-pair corresponding to sequences of messages at each tier-pair, assess the activity intervals at each lower level tier-pair based on parameters associated with activity intervals at a higher level tier-pair to identify activity intervals at the lower level tier pair that are potentially related to activity intervals at the higher level tier pair, and compare the messages of activity intervals at the lower level tier-pairs that are potentially related to activity intervals at the higher level tier pair to identify messages at the lower level tier-pairs corresponding to one or more activity intervals at a highest level tier-pair.

37. The medium of claim 36, wherein the software causes the processor to compare the messages by encoding content of some or all of the messages into letters of a finite-alphabet set to form corresponding encoded messages, such that a single letter of the finite-alphabet in each encoded message corresponds to a plurality of bytes in the original message, and comparing the corresponding encoded messages.

38. The medium of claim 36, wherein the messages being compared at each tier-pair correspond to messages captured during repeated executions of an application.

39. A system comprising:
a traffic selector that receives a plurality of network traces, each network trace corresponding to original messages communicated between two nodes of a tier-pair during an execution episode of an application,
an encoder that encodes content of some or all of the original messages in each network trace into letters of a finite-alphabet set to form corresponding encoded messages, such that a single letter of the finite-alphabet in each encoded message corresponds to a plurality of bytes in the original message, and
a message comparer that compares the encoded messages of a first episode to the encoded messages of a second episode to identify encoded messages that are similar to each other, and identifies original messages in at least one of the plurality of network traces corresponding to the encoded messages that are identified as being similar to each other.

40. The system of claim 39, wherein the traffic selector is configured to filter the network traces to identify the original messages of the tier-pair based on messages communicated between nodes of an other tier-pair.

41. The system of claim 40, wherein the traffic selector is configured to group the messages of the other tier-pair into activity intervals, and filter the network traces based on parameters associated with these activity intervals.

42. The system of claim 40, wherein the traffic selector is configured to group the original messages of the tier-pair into first activity intervals, group the messages of the other tier-pair into second activity intervals, and filter the network traces based on a correspondence in time between the first and second activity intervals.

43. The system of claim 42, wherein the traffic selector is configured to score the first activity intervals based on the correspondences in time and filter the network traces based on a score of each of the first activity intervals.

44. The system of claim 43, wherein the score is based on:
an overlap in time between the first and second activity intervals,
a correspondence in time between a start of the first activity interval and a start of the second activity interval, and
a correspondence in time between an end of the first activity interval and an end of the second activity interval.

45. The system of claim 39, wherein the encoder is configured to encode the messages via a hashing of the plurality of bytes of the original message.

46. The system of claim 39, wherein the encoder is configured to form one or more of the plurality of bytes of the original message based on break points associated with the original message.

47. The system of claim 46, wherein the break points are based on a structure of the original message.

48. The system of claim 46, wherein the break points are based on content of the original message.

49. The system of claim 39, wherein the message comparer is configured to compare the encoded messages of the first and second episodes by forming k-tuples of letters of the first and second encoded messages and comparing the k-tuples of the first and second encoded messages.

50. The system of claim 49, wherein the message comparer is configured to compare the first and second encoded messages based on k-tuples of a first size, then compare at least parts of the first and second encoded messages based on k-tuples of a second size that is smaller than the first size.

51. The system of claim 49, wherein the message comparer is configured to compare the first and second encoded messages by creating a matrix of coincidences between the first and second encoded messages and assessing coincidences of k-tuples along diagonals of the matrix.

52. The system of claim 51, wherein the message comparer is configured to assess the coincidences includes accumulating a count of sequential coincidences along the diagonals.

53. The system of claim 39, wherein the message comparer is configured to compare the encoded messages of the first and second episodes by determining a longest common sequence of coincidences of letters in the encoded messages.

54. The system of claim 39, wherein the message comparer is configured to compare encoded messages of a third episode of the application to the encoded messages of the first and second episodes that are identified as being similar to identify encoded messages that are similar in the first, second, and third episodes.

55. A system comprising:
a traffic selector that:
receives traces of messages communicated among tier-pairs within a hierarchy of tier-pairs, such that messages at a higher level of the hierarchy have a causal relationship to one or more messages at a lower level of the hierarchy,
identifies activity intervals at each tier-pair corresponding to sequences of messages at each tier-pair, and
assesses the activity intervals at each lower level tier-pair based on parameters associated with activity intervals at a higher level tier-pair to identify activity intervals at the lower level tier pair that are potentially related to activity intervals at the higher level tier pair, and
a message comparer that compares the messages of activity intervals at the lower level tier-pairs that are potentially related to activity intervals at the higher level tier pair to identify messages at the lower level tier-pairs corresponding to one or more activity intervals at a highest level tier-pair.

56. The system of claim 55, including an encoder that is configured to encode content of some or all of the messages into letters of a finite-alphabet set to form corresponding encoded messages, such that a single letter of the finite-alphabet in each encoded message corresponds to a plurality of bytes in the original message, and the message comparer is configured to compare the corresponding encoded messages.

57. The system of claim 55, wherein the messages being compared at each tier-pair correspond to messages captured during repeated executions of an application.

* * * * *